(12) United States Patent
Kolavennu et al.

(10) Patent No.: US 10,990,386 B2
(45) Date of Patent: Apr. 27, 2021

(54) LOCALIZED EXECUTABLE FUNCTIONS PLATFORM FOR EXECUTION OF DIAGNOSTIC, OPERATIONAL, AND OTHER COMPUTATIONAL ALGORITHMS

(71) Applicant: Honeywell International Inc., Morris Plains, NJ (US)

(72) Inventors: Soumitri Kolavennu, Blaine, MN (US); Ramdas Pai, Morris Plains, NJ (US); Ramchandra D. Joshi, Montville, NJ (US); Heikki Laine, Pittstown, NJ (US)

(73) Assignee: Honeywell International Inc., Charlotte, NC (US)

( * ) Notice: Subject to any disclaimer, the term of this patent is extended or adjusted under 35 U.S.C. 154(b) by 186 days.

(21) Appl. No.: 16/154,430

(22) Filed: Oct. 8, 2018

(65) Prior Publication Data
US 2020/0110605 A1 Apr. 9, 2020

(51) Int. Cl.
*G06F 9/30* (2018.01)
*G06F 13/12* (2006.01)
*G06N 20/00* (2019.01)

(52) U.S. Cl.
CPC ........ *G06F 9/30003* (2013.01); *G06F 13/126* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,036,819 A | 8/1991 | Peter et al. | |
| 6,247,077 B1 | 6/2001 | Muller et al. | |
| 6,424,962 B1 | 7/2002 | Billon | |
| 7,283,538 B2 | 10/2007 | Pham et al. | |
| 9,756,050 B1 | 9/2017 | Brandwine | |
| 9,798,336 B2 | 10/2017 | Przybylski | |
| 9,798,569 B2 | 10/2017 | Lai et al. | |
| 9,874,885 B2 * | 1/2018 | Shetty | G05D 23/1923 |
| 9,995,501 B2 * | 6/2018 | Quam | F24F 11/70 |
| 10,009,957 B2 * | 6/2018 | Pereira | H05B 6/687 |
| 10,371,400 B2 * | 8/2019 | Quam | F24F 11/62 |
| 2015/0127170 A1 * | 5/2015 | Quam | F24F 11/64 |
| | | | 700/276 |
| 2018/0364665 A1 * | 12/2018 | Clymer | H05B 47/19 |

* cited by examiner

*Primary Examiner* — Van H Nguyen
(74) *Attorney, Agent, or Firm* — Seager, Tufte & Wickhem LLP

(57) ABSTRACT

A device for providing a localized executable functions platform to generate information for control systems. The device may comprise an I/O interface configured to communicate with the control systems, a memory configured to store a set of executable functions, and an executable functions platform configured to receive an initialization, determine an executable function needed to obtain information pertaining to a control system, access the executable function from the memory, run the executable function using input data for the control system, obtain the information pertaining to the control system in response to running the executable function, and provide the information pertaining to the control system.

18 Claims, 5 Drawing Sheets

LOCALIZED EXECUTABLE FUNCTIONS PLATFORM FOR EXECUTION OF DIAGNOSTIC, OPERATIONAL, AND OTHER COMPUTATIONAL ALGORITHMS

BACKGROUND

The disclosure relates generally to control systems, and more particularly to an executable functions platform for monitoring and controlling the operation of control systems. In industrial processes there are several systems that may run as part and parcel of the operations of the process. These systems often require a computational element and a memory element to be executed. Traditionally these elements have been in close vicinity of the process in embodiments of personal computers or programmable logic controllers, and so on. With the advent of industrial internet of things, the capability of using these systems in remote computational servers has become available. The process may communicate the information required to run the computation in the remote server. The remote server may be part of a public or private cloud. However, the mechanism by which the computational elements are executed even in the remote server has not necessarily fundamentally changed. There still appears a need for the remote server to be configured as it would have been configured (as a local PC) in the cloud. An issue of provisioning a PC, albeit in the cloud, configuring it, providing it with a file system and operating system and various services (like web service, network stack) may still remain. What would be desirable is a platform capable of simplifying the infrastructure and the framework required for monitoring and controlling the operations of the industrial processes of control systems for various different consumers.

SUMMARY

This disclosure relates generally to control systems, and more particularly to an executable functions platform for monitoring and controlling the operation of control systems. In one example, a device may provide a localized executable functions platform to generate information for control systems. The device may comprise an I/O interface configured to communicate with the control systems, a memory configured to store a set of executable functions, and an executable functions platform operatively coupled to the I/O interface and the memory. The executable functions platform may be configured to receive an initialization, determine an executable function needed to obtain information pertaining to a control system in response to the initialization, access the executable function from the set of executable functions stored in the memory, run the executable function using input data for the control system, obtain the information pertaining to the control system in response to running the executable functions, and provide the information pertaining to the control system in response to obtaining the information.

Alternatively or additionally to the foregoing, the initialization may comprise a request for the information pertaining to the control system.

Alternatively or additionally to any of the embodiments above, the initialization may comprise a download/upload of the input data.

Alternatively or additionally to any of the embodiments above, the initialization may comprise an occurrence of a specific time.

Alternatively or additionally to any of the embodiments above, the initialization may comprise a change of state of the memory.

Alternatively or additionally to any of the embodiments above, the initialization may comprise a change of state of the control system.

Alternatively or additionally to any of the embodiments above, the executable functions may comprise industrial lambda functions.

Alternatively or additionally to any of the embodiments above, the industrial lambda functions may include machine learning algorithms, first principle domain model simulations, operational workflow management, inventory management, operations management, control system diagnostics, and control system analytics algorithms.

Alternatively or additionally to any of the embodiments above, the device may further comprise a user interface that may include a display and the input data may be provided via the user interface and the information pertaining to the control system may be provided on the display.

Alternatively or additionally to any of the embodiments above, the executable functions platform may be further configured to run a second executable function when the second executable function is called by the executable function.

In another example of the disclosure, an executable functions platform may be used to generate information for control systems. The executable functions platform may comprise a trigger manager configured to identify an initialization event and a controller operatively coupled to the trigger manager. The controller may be configured to receive an initialization from the trigger manager, wherein the trigger manager sends the initialization in response to identification of the initialization event, determine an executable function needed to obtain information pertaining to a control system in response to the initialization, access the executable function stored in a local memory, run the executable function using input data for the control system, obtain the information pertaining to the control system in response to running the executable function, and provide the information pertaining to the control system in response to obtaining the information.

Alternatively or additionally to any of the embodiments above, the initialization event may comprise a request for the information pertaining to the control system.

Alternatively or additionally to any of the embodiments above, the initialization event may comprise a download/upload of the input data.

Alternatively or additionally to any of the embodiments above, the initialization event may comprise an occurrence of a specific time.

Alternatively or additionally to any of the embodiments above, the initialization event may comprise a change of state of the memory.

Alternatively or additionally to any of the embodiments above, the initialization event may comprise a change of state of the control system.

Alternatively or additionally to any of the embodiments above, the executable function may comprise an industrial lambda function.

Alternatively or additionally to any of the embodiments above, the executable functions platform may be stored on a device that includes an I/O interface configured to communicate with the control systems, the local memory configured to store a set of executable functions, and where the executable functions platform is operatively coupled to the I/O interface and the local memory.

Alternatively or additionally to any of the embodiments above, the device may be operatively coupled to a remote device and the initialization event can be sent from the remote device.

In another example of the disclosure, a system may provide a localized executable functions platform to generate information for control systems. The system may comprise a device including an I/O interface configured to communicate with the control systems, a memory configured to store a set of executable functions, an executable functions platform operatively coupled to the I/O interface and the memory and configured to receive an initialization, determine an executable function needed to obtain information pertaining to a control system in response to the initialization, access the executable function from the set of executable functions stored in the memory, run the executable function using input data for the control system, obtain the information pertaining to the control system in response to running the executable function, and provide the information pertaining to the control system in response to obtaining the information. The system may also include a remote device operatively coupled to the device and the initialization is sent from the remote device.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE DRAWING

The disclosure may be more completely understood in consideration of the following description in connection with the accompanying drawings, in which.

Figure 1:
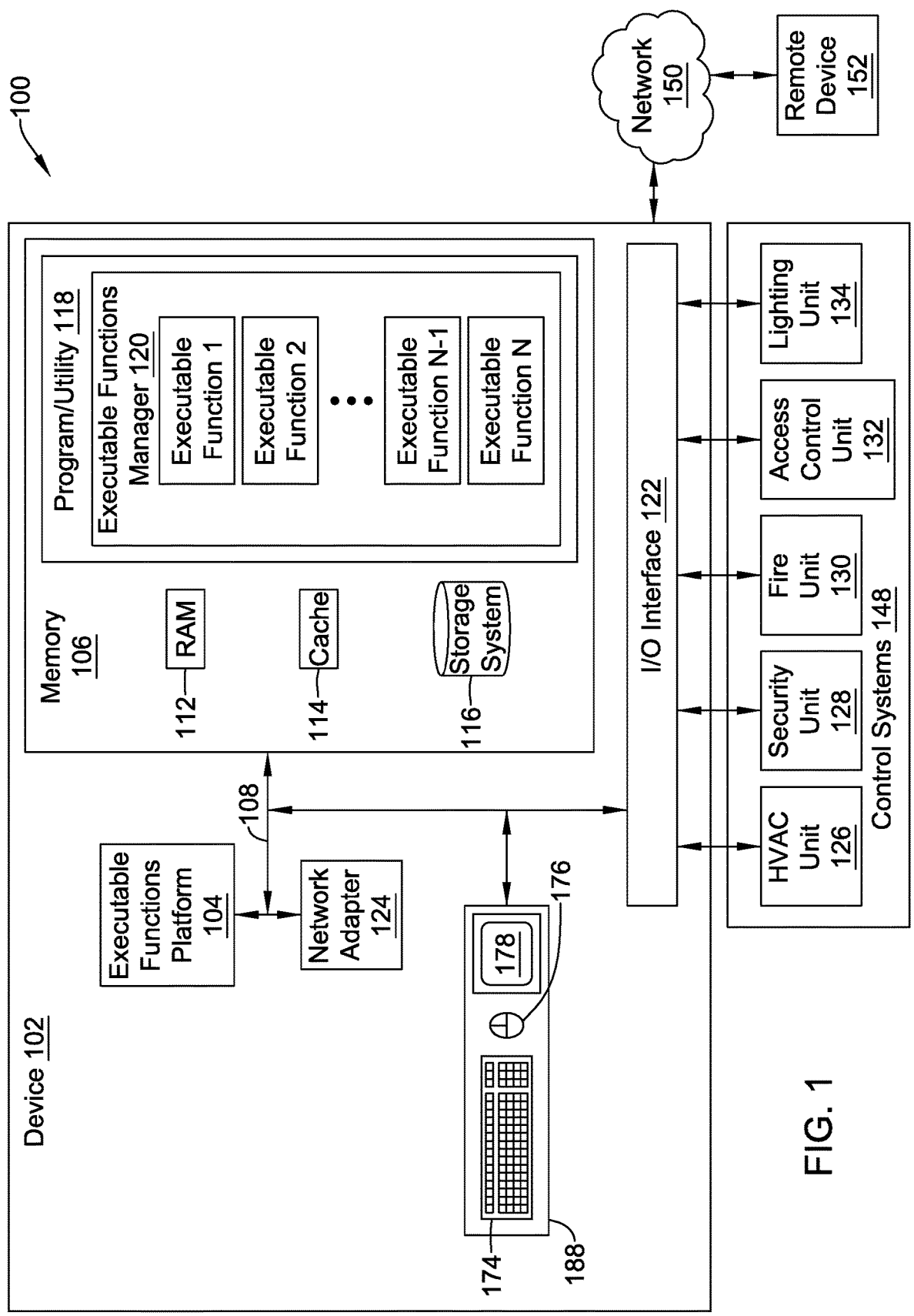
FIG. 1 is a schematic block diagram of an illustrative system.

While the disclosure is amenable to various modifications and alternative forms, specifics thereof have been shown by way of example in the drawings. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", and so on, indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used in connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Certain embodiments of the present disclosure may be found in a system, a method, and/or a non-transitory computer-readable storage medium with an executable program stored thereon for implementing and/or using an executable functions platform that may simplify the infrastructure and framework required for running executable functions, such as industrial lambda functions or other algorithmic computations. In some cases, the executable functions platform may be built so that the executable functions may be triggered by an initialization. In some cases, the initialization may include a request for information pertaining to a control system that is being monitored or by an occurrence of an event (e.g., a time, a system condition, a device condition, downloading data, uploading data, and so forth). In some cases, the executable functions platform may be capable of running or executing the triggered executable functions on demand without having to access a wide area network and/or accessing a remote server (e.g., a cloud based server), and providing the information pertaining to the control system.

In some cases, the executable functions platform may be capable of abstracting the infrastructure and the effort of building the infrastructure for delivering a computational sophisticated system for monitoring and evaluating control systems. As such, in some instances, engineers and scientists providing the industrial lambda functions, or other algorithmic computations, can concentrate on delivering optimal computational embodiments of the industrial lambda functions and not worry about external factors such as the number of parallel executions of the industrial lambda functions, the underlying operating system under which the industrial lambda functions are being executed, and the privacy and storage of the data (both inputs and output data). Additionally, customers may not need to purchase space in a cloud infrastructure for the industrial lambda functions. For example, a cloud function that is run perhaps once every 3 months (quarterly) or on exception (when an equipment piece fails) may not warrant the cost of providing a cloud based server that is running all the time. However, industrial lambda functions may be typically charged for the amount of run time and not the amount of uptime of a server. Therefore, embodiments of the executable functions platform may be more efficient and provide a cost advantage over a cloud based server. Accordingly, this disclosure may describe systems, methods, and executable programs to create an environment that can more easily monitor and identify certain aspects of control systems to allow increased control and potentially increase operational efficiency of the control systems.

An "executable function" can be considered an operational test that can be used to determine a status and/or state of a control system. For instance, the executable function may be a computational element of control, diagnostic, maintenance, and unique operational mode activation (e.g., startup activation) of a control system. In some cases, the executable functions may require a computational element and a memory element to be executed. Accordingly, the executable functions may be provided with the computational elements and the memory elements from "input data" provided by a user, a control system (e.g., a controller of the control system), and/or a localized storage memory. Generally, "input data" can be classified into one of four or more categories including an analog input, a discrete input, an analog output and a discrete output. An analog input may correspond to, for example, a sensor that monitors physical data, such as temperature, a flow, or a pressure. A discrete input may correspond to, for example, a sensor that monitors status, such as the status of a momentary and maintained switch, ON-OFF equipment status, and digital pulses from flow and/or electric power meters. An analog output may correspond to, for example, a physical action of a proportional device in the controlled equipment, such as opening an air damper, valve or inlet guide vane from 20% to 40%. A discrete output may correspond to, for example, a change to a device status, such as momentary or maintains switching for start/stop of pumps, fans, two-position dampers, and on/off control. These are just examples. The control systems or the industrial processes of the control systems may each have a different set of available input data.

In some cases, the executable function may be an "industrial lambda function". In some instances, the industrial lambda function may be an independent computational function that can execute in a finite amount of time. The industrial lambda function may also be stateless and atomic, such that its execution, once triggered, should not depend on the state of execution of any other industrial lambda function or a previous execution of the same industrial lambda function. In some cases, the industrial lambda function may be idempotent, that is, execution of the industrial lambda function with the same input may provide the same output all of the time. In some cases, the industrial lambda function may be triggered with a request or query, a predefined input on various events, in a periodic fashion, and so on. In some instances, the industrial lambda functions may be anonymous and elastically scalable in terms of execution. As such, the industrial lambda functions can be provided as a service to any customer irrespective of the size and capacity of the customers' resources. In some examples, the industrial lambda function may also be constructible in a means that is turing complete. Examples of industrial lambda functions may include, but are not limited to, machine learning algorithms, first principle domain model simulation, operational workflow management, inventory management, operations management, control system diagnostics, and control system analytics algorithms.

Accordingly, since the lambda functions may be anonymous and can be chained (one lambda function calling another lambda function), outside companies, organizations, and/or vendors can add value-services on top of the industrial lambda functions already built. This provides a means for the market place to create a "lambda function store" for end customers to choose from. Moreover, embodiments of the executable functions platform may ensure confidentiality of the intellectual property as well as privacy of the user's data.

Turning now to the Figures, FIG. 1 is a schematic block diagram of an illustrative system 100 for providing a localized executable functions platform to generate information for control systems. In some cases, the system 100 may include a device 102, control systems 148 operatively coupled to the device 102, and a remote device 152. As shown, the control systems 148 may include, but are not limited to, a Heating, Ventilation, and/or Air Conditioning (HVAC) system 126, a security system 128, a fire system 130, an access control system 132, and a lighting system 134.

In some cases, the HVAC system 126 may include one or more HVAC control devices (e.g., Air Handing Units (AHU), Variable-Air-Volume (VAV) units, dampers, valves, fans, heating units, cooling units, sensors, thermostats, humidifiers, dehumidifiers, and so on), which allow for the monitoring and/or control of temperature and/or other environmental conditions in a building. The security system 128 may include sensors, alarm devices, audio/visual devices, lights, contact sensors for monitoring the state of doors and windows, security card pass systems, electronic locks, and so forth. The fire system 130 may include smoke/heat sensors, a sprinkler system, warning lights, and so on. The access control system 132 may include doors, door locks, windows, window locks, turnstiles, parking gates, elevators, or other physical barrier, where granting access can be electronically controlled. The lighting system 134 may include emergency lights, outlets, lighting, drapes, and general load switching, some of which are subject to "dimming" control which varies the amount of power delivered to various control devices. These are just a few examples of the control systems 148. In some cases, the control systems 148 may also include low voltage devices (not shown) that may include, but are not limited to, garage door openers, lawn sprinklers, exterior lights, and pool/spa heaters (controlled via a relay or the like).

As shown in FIG. 1, the device 102 can function as a local server, a personal computer, a client, a local controller, or any other suitable device. In the example shown, the device 102 can perform various communication and data transfer functions as described herein and can execute one or more application functions. Device 102 can be any of a wide variety of computing devices, such as a server computer, a desktop computer, a handheld computer, a tablet computer, mobile telephone or other mobile device, and the like. The components of computing device 102 may include, but are not limited to, an executable functions platform 104, a memory 106, an input/output (I/O) interface 122, a network adapter 124, a user interface 188, and a bus 108 that couples various system components including the memory 106 to the executable functions platform 104. The executable functions platform 104 may include one or more controllers or processors that execute instructions stored in the memory 106.

When provided, the bus 108 may represent one or more of any of several types of bus structures, including a memory bus or memory controller, a peripheral bus, an accelerated graphics port, and a processor or local bus using any of a variety of bus architectures. By way of example, and not as a limitation, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Device 102 may include a variety of computer system readable media. Such media may be any available media that are accessible by the device 102, and it may include volatile memory, non-volatile memory, removable and non-removable media.

The memory 106 of the device 102 can include computer system readable media in the form of volatile memory, such as random access memory (RAM) 112 and/or cache memory 114. Device 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVDROM or other optical media may be provided. In such instances, each may be connected to the bus 108 by one or more data media interfaces. As will be further depicted and described herein, the memory 106 may include at least one program product having a set of program modules that are configured to carry out the functions of providing executable functions, such as industrial lambda functions, to the executable functions platform 104.

In some cases, a program/utility 118 may be stored in the memory 106 and may include a set of application program modules (e.g., software), such as an executable functions manager 120. In some cases, the program/utility 118 may include additional program modules as well as an operating system, one or more other application program modules, and program data. In some cases, the application program modules (e.g., the executable functions manager 120) may include a set of executable functions (i.e., executable functions 1-N), such as industrial lambda functions, for example. In some cases, the executable functions manager 120, including the executable functions 1-N, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

In some cases, the local computing device 102 may communicate with one or more devices such as the control systems 148. Such communication can occur via Input/Output (I/O) interface(s) 122. In some cases, the control systems 148 may be monitored and managed by the device 102. In some cases, the device 102 may use the executable functions platform 104 to send control instructions to the control systems 148. For instance, the executable functions platform 104 of the device 102 may be operatively coupled to I/O interface(s) 122 via the bus 108, and may use the I/O interface 122 to communicate with control systems 148.

In some cases, the I/O interface 122 may be connected to the control systems 148 through a wired or wireless network, and in some cases the I/O interface 122 may communicate with the control systems 148 using one or more different communication protocols. For example, in some cases, the I/O interface 122 may communicate with the HVAC unit 126 through serial and/or parallel communication using building automation protocols over a BACnet. In some cases, the I/O interface 122 may communicate with the security unit 128 through serial and/or parallel communication using building automation protocols over a DC-09 network. In some cases, the I/O interface 122 may communicate with the fire unit 130 through serial and/or parallel communication using building automation protocols over a Modbus network. In some cases, the I/O interface 122 may communicate with the access control unit 132 through serial and/or parallel communication using building automation protocols over an EnOcean network. In some cases, the I/O interface 122 may communicate with the lighting unit 134 through serial and/or parallel communication using building automation protocols over a DALI network. These are just examples of building control network protocols that may be used to facilitate communication between the local computing device 102 and the building control components of various building control units 148. Other building control network protocols that are contemplated include, but are not limited to, 1-Wire, C-Bus, CC-Link Industrial Networks, DSI, Dynet, KNX, LonTalk, oBIX, VSCP, xAP, X10, Z-Wave, ZigBee, INSTEON, TCIP, and/or Ethernet.

In some cases, the device 102 may further include the user interface 188. In the example shown in FIG. 1, the user interface 188 is operatively coupled to the executable functions platform 104, and permits the device 102 to solicit information, such as input data for execution of the executable function 1-N and display information pertaining to the control systems 148. In some cases, the user interface 188 may be a physical user interface that is accessible at the device 102 and may include a keyboard 174, a mouse 176, and a display 178, which enable a user to interact with the device 102. The display 178 may be any suitable display. In some instances, the display 178 may include or may be a liquid crystal display (LCD), an OLED, and so forth, and in some cases may be a fixed segment display, a dot matrix LCD display, a 7-segment type display, and/or may include one or more LEDs. In some cases, the display 178 may include a touch screen LCD panel that functions as both the display 178, the keyboard 174, and the mouse 176. In some cases, the user interface 188 may be provided as a separate unit from the device 102, and may facilitate a user's interactions with the device 102. For example, the user interface 188 may be provided as part of a remote device (e.g., remote device 152), such as a smart phone, a tablet computer, a laptop computer, or a desktop computer. In some cases, the user interface 188 may communicate with the device 102 via a network such as, for example, a network 150 (e.g., Internet, Wi-Fi, and so forth).

In some cases, the user interface 188 may be used to send a request for information pertaining to the HVAC system 126, for example, to the executable functions platform 104. In some cases, a request for information may be an initialization or an initialization event for the executable functions platform 104. Once the executable functions platform 104 receives the request, the executable functions platform 104 may determine the executable function 1-N needed to obtain the requested information. In some cases, the executable functions manager 120, may provide the information necessary for the executable functions platform 104 to determine which executable function 1-N is needed and to access the needed executable function. In some examples, to run the executable function, input data may be needed. In this example, the executable functions platform 104 may use the display 178 to prompt a user for the input data and the user may provide the input data using the keyboard 174 and/or the mouse 176. In some cases, the input data may be uploaded or downloaded to the executable functions platform 104. In some cases, the executable functions platform 104 may use the I/O interface 122 to obtain the input data from the control systems 148 (e.g., a controller of the HVAC system 126). In some cases, the input data may be provided by the memory 106. In any case, once the executable functions platform 104 has the necessary input data, the executable functions platform 104 may run the executable function and obtain the requested information. In some cases, the executable functions platform 104 may then provide the requested information using the user interface 188.

In some cases, the executable functions platform 104 may automatically access the executable functions 1-N (i.e., without receiving a request for information) and run an executable function to obtain information pertaining to the control systems 148. For example, in some instances, the executable functions platform 104 may be programmed to run an executable function or functions to obtain information pertaining to the control systems 148 at a specific time each day. In some cases, the executable functions platform 104 may be programmed to run an executable function or functions to obtain information pertaining to the control system 148 when input data are uploaded and/or downloaded. In some cases, the executable functions platform 104 may be programmed to run an executable function or functions to obtain information pertaining to the control systems 148 when a control system (e.g., the HVAC system 126, the security system 128, the fire system 130, the access control system 132, or the lighting system 134) changes state or a component of the control system changes state. In still further examples, the executable functions platform 104 may be programmed to run an executable function or functions to obtain information pertaining to the control systems 148 when the memory 106 changes state and/or is reconfigured. These are just a few examples of situations in which the executable functions platform 104 may automatically access the executable functions 1-N and run an executable function to obtain information pertaining to the control systems 148. This list is by no means exhaustive and there may be other situations where the executable functions platform 104 is programmed to automatically access and run an executable function.

In some cases, the device 102 and the remote device 152, when both are provided, may utilize a network 150 to communicate. In some examples, the network 150 may be a local area network (LAN), a general wide area network (WAN), and/or a public network (e.g., the Internet). Furthermore, in some cases, the network 150 may include copper transmission cables, optical transmission fibers, wireless transmission, routers, firewalls, switches, gateway computers and/or edge servers. In some instances, the network adapter 124 is included in the device 102 to support communication (e.g., communication with the remote device 152). In some cases, the device 102 may use the network 150 to communicate with the control systems 148. In other cases, there may be multiple remote devices 152 and control systems 148 that can access the network 150 and communicate with the device 102 or directly to the executable functions platform 104.

In some cases, the remote device 152 may be a smart phone, tablet computer, laptop computer, personal computer, PDA, and/or the like. In some cases, the remote device 152 may provide a primary and/or a secondary user interface for a user to interact with the device 102. In some cases, the device 102 may utilize a wireless protocol to communicate with the remote device 152 over the network 150. In some cases, the remote device 152 may execute an application program that facilitates communication and control of the device 102. The application program may be provided by and downloaded from an external web service (e.g., Apple Inc.'s ITUNES®, Google Inc.'s Google Play, a proprietary server, and so forth) for this purpose, but this is not required. In one example, the application program may cause the device 152 to run the executable functions 1-N and provide information pertaining to the control systems 148. Additionally, the application program may be capable of accepting an input from a user through the user interface of the remote device 152 and transmit requests for information and input data to the device 102. For example, if the user inputs include requests for information pertaining to the HVAC system 126 or input data needed to run an executable function, the application program may transmit these requests and input data to the device 102.

Figure 2:
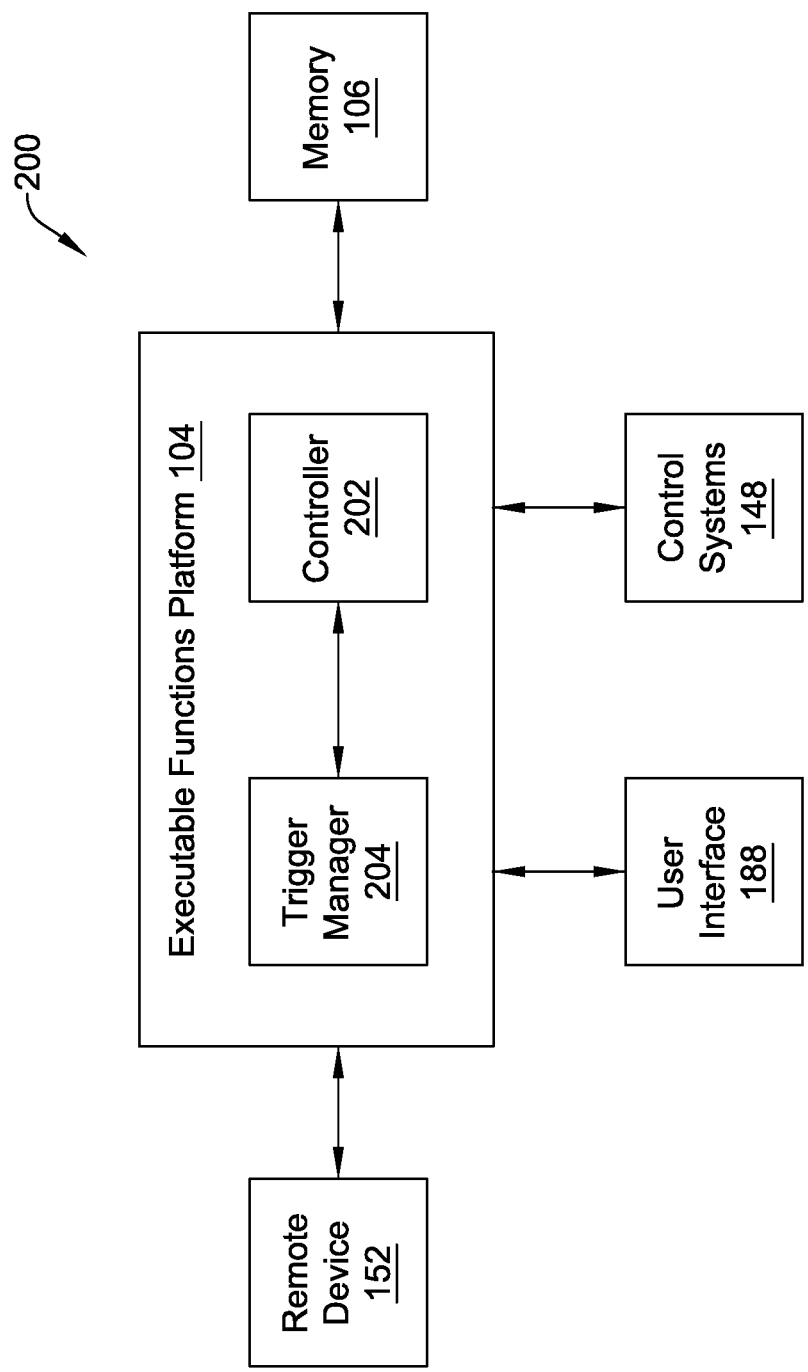
FIG. 2 is a schematic block diagram of an illustrative executable functions platform.

FIG. 2 depicts an illustrative operation 200 of the executable functions platform 104 used to generate information for control systems. In this example, the executable functions platform 104 may include a controller 202 and a trigger manager 204. In some cases, the trigger manager 204 and the controller 202 (e.g., microcontroller, microprocessor, and so on) may be operatively coupled to the memory 106, the user interface 188, and the remote device 152. In some cases, the memory 106 may be a local memory, that is the executable functions platform 104 does not have to have access to a wide area network to communicate with the memory 106 and/or the memory 106 is not located on a cloud based server.

In some cases, the trigger manager 204 may be configured to initialize the controller 202 to access the memory 106 for the executable functions and run the executable functions to obtain information pertaining to control systems. In some cases, the trigger manager 204 may be configured to identify an initialization event and initialize the controller 202 in response to identifying an initialization event. For instance, in some cases, the initialization event may be a request for information pertaining to the control systems 148 (e.g., a request from a user using user interface 188 or the remote device 152). In some cases, the initialization event may be the uploading or downloading of input data. In some cases, the initialization event may be the occurrence of a specific time. In some cases, the initialization event may be the change of state of the memory 106. In some cases, the initialization event may be the change of state of the control systems 148. These are just a few examples.

In some cases, once the controller 202 is initialized by the trigger manager 204, the controller 202 may determine the executable function needed to obtain the information pertaining to a control system. In some cases, when the controller 202 determines the needed executable function(s), the controller 202 may then access the needed executable function(s) from the memory 106. As stated herein, input data, provided from the user interface 188, the control systems 148, the memory 106, and so forth, may be needed to run the executable function(s). Once the controller 202 has the necessary input data, the controller 202 may run the executable function(s) and obtain the information. In some cases, the controller 202 may then provide the information using the user interface 188.

Figure 3:
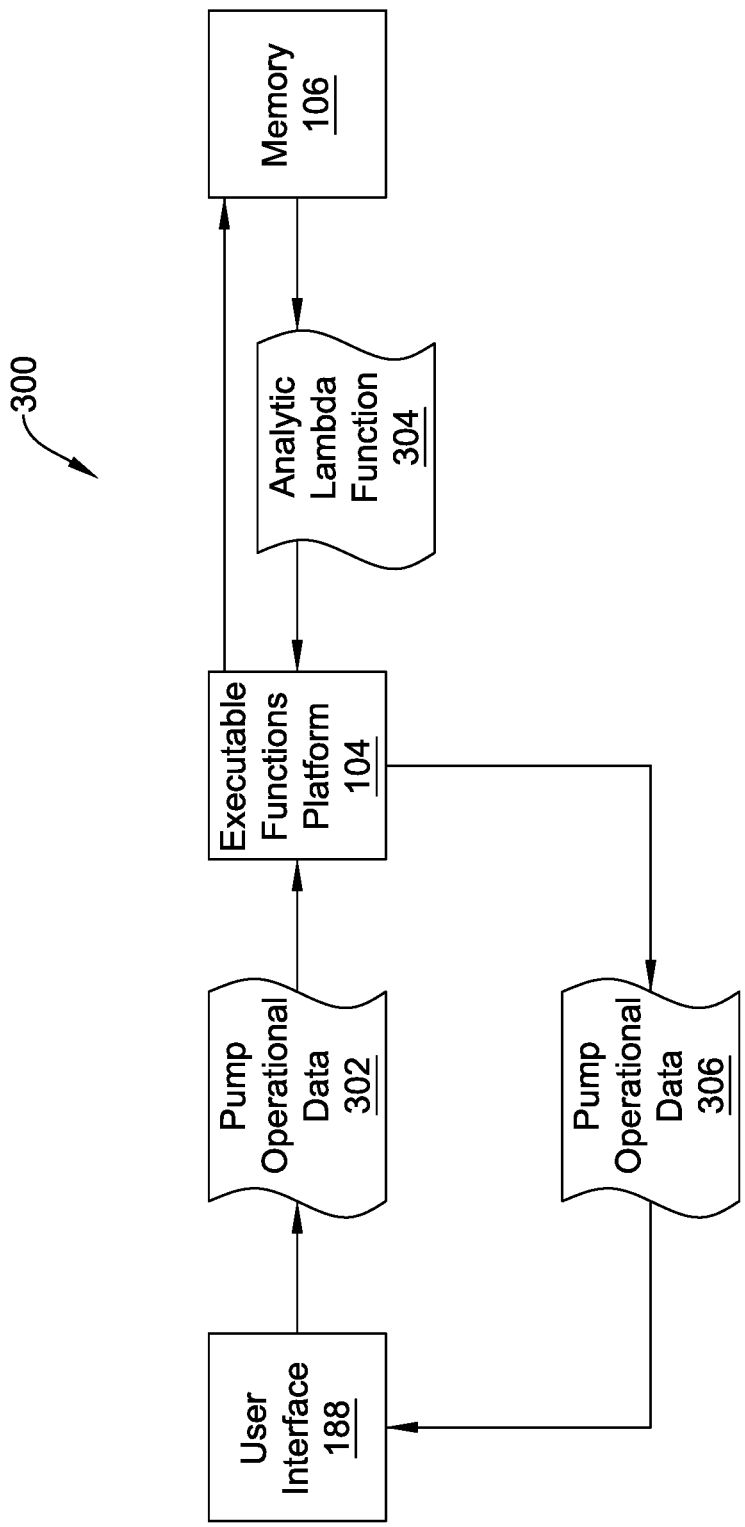
FIG. 3 is an illustrative operation of the executable functions platform.

FIG. 3 depicts an illustrative operation 300 of the executable functions platform 104 generating diagnostic information for centrifugal pumps. In some cases, a customer may require that diagnostics be run on all pumps in a facility at the beginning of every shift. As such, the customer may upload operational data 302 for each of the pumps to the executable functions platform 104 using the user interface 188. This upload may automatically trigger the executable functions platform 104 to access an analytic lambda function 304 that is capable of assessing the health of the pumps and detecting any impending failures that may happen. The executable functions platform 104 may then run the analytic lambda function 304 using the operational data 302. In some cases, the executable functions platform 104 may scale the execution of the analytic lambda function 304 in a stateless fashion. The auto scaling may ensure that the computation time and speed is not affected by the number of pumps operating in the facility as well as the number of facilities. Once, the analytic lambda function 304 has been executed, the diagnostic information 306 for each pump may be obtained and provided back to the user interface 188 and to the customer. Memory 106 may be connected to executable functions platform 104 and the magnetic lambda function 304.

Figure 4:
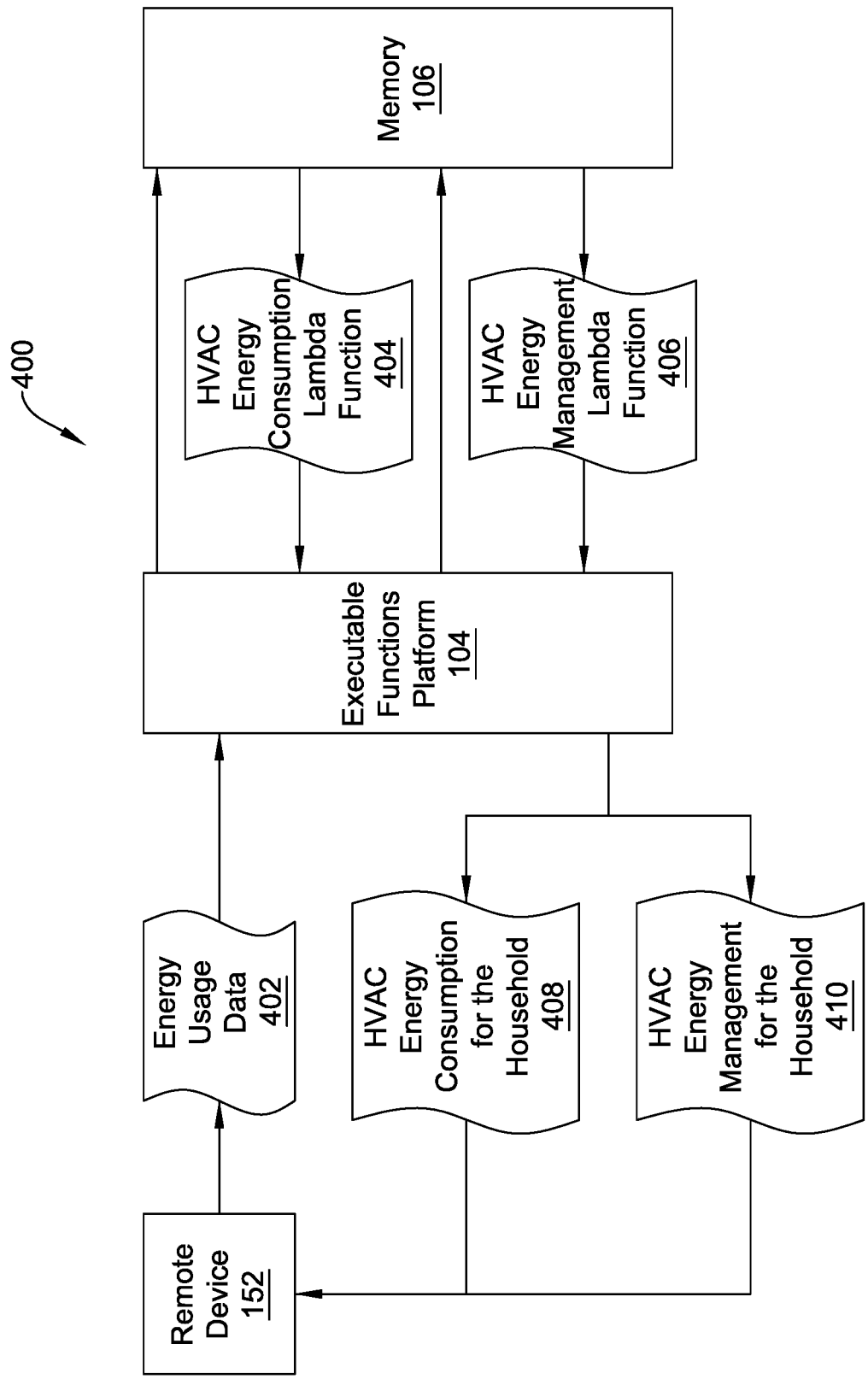
FIG. 4 is another illustrative operation of the executable functions platform.

FIG. 4 depicts another illustrative operation 400 of the executable functions platform 104 generating energy consumption information for a household. In some cases, a service technician for a utility company may use the remote device 152 to upload energy usage data 402 from a billing cycle for a particular house. This upload may automatically trigger the executable functions platform 104 to access an HVAC energy consumption lambda function 404 from the memory 106. The HVAC energy consumption lambda function may be capable of comparing and disaggregating the HVAC energy usage from the other household energy usages and provide a proportion in dollars and kW hours of the HVAC energy consumption of the house. The executable functions platform 104 may then run the HVAC energy consumption lambda function 404 using the energy usage data 402. In some cases, the energy consumption lambda function 404 may include a "call" to another industrial lambda function. For instance, when the energy consumption lambda function 404 is run, the executable functions platform 104 may see a "call" for an HVAC energy management lambda function 406. Before, during, or after execution of the HVAC energy consumption lambda function 404, the executable functions platform 104 may access the HVAC energy management lambda function 406 from the memory 106. The HVAC energy management lambda function 406 may be capable of analyzing the scores of the HVAC usage and provide recommendations for better energy management to the home owner and provide coupons and rebates for the recommendation. Accordingly, once the HVAC energy consumption lambda function 404 and the HVAC energy management lambda function 406 have been executed, HVAC energy consumption for the household 408 and HVAC energy management information for the household 410 may be obtained and provided back to the remote device 152 and to the service technician. In some cases, no server may be necessary for this computation to run and the cost of infrastructure of the executable platform 104 may only be proportional to the number of households and the number of cycles of computation for the consumption lambda function 404 and the management lambda function 406. Moreover, in some instances, this information could be used by a utility company to better prepare for demand response events in a community as well as in energy efficiency programs.

Figure 5:
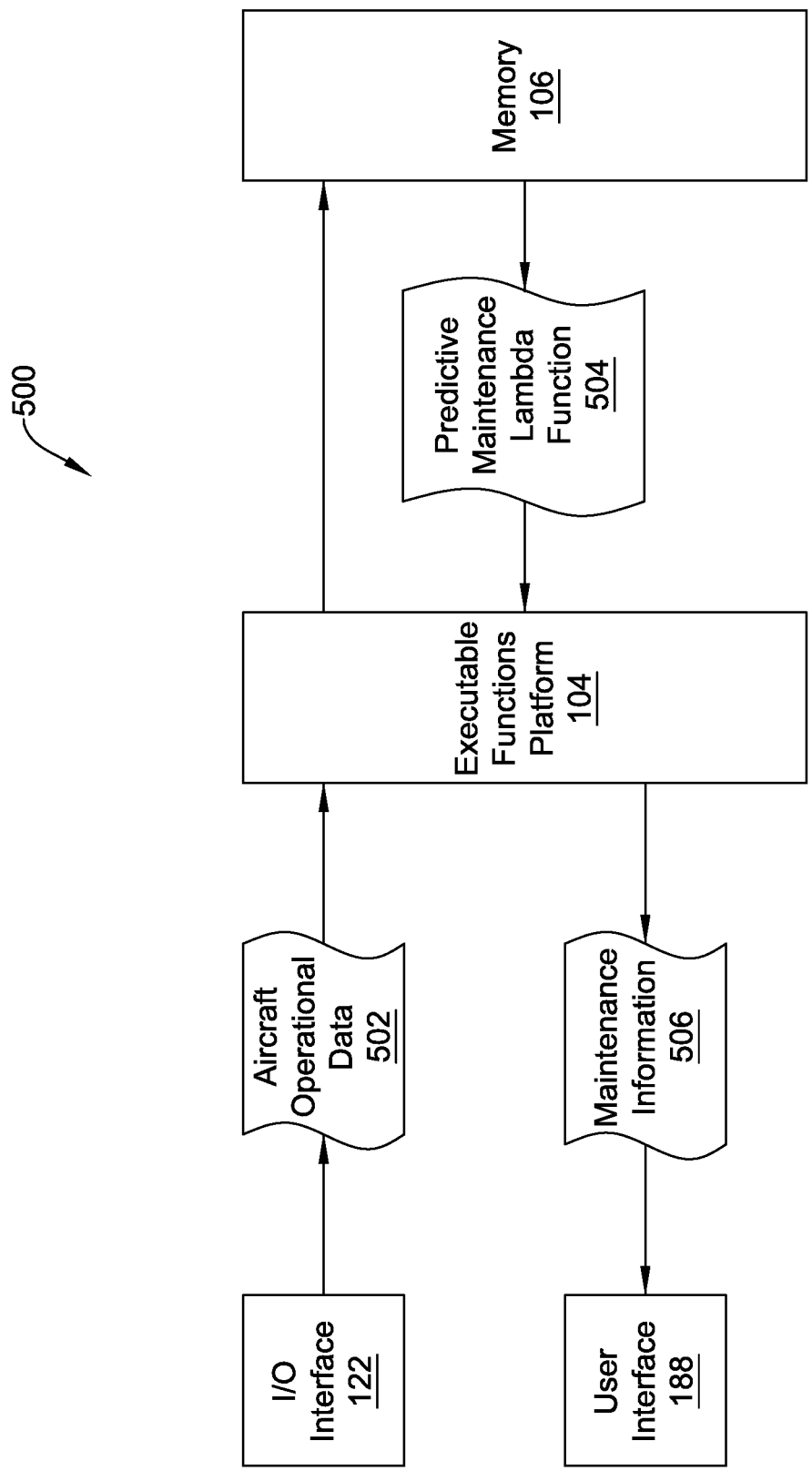
FIG. 5 is another illustrative operation of the executable functions platform.

FIG. 5 depicts another illustrative operation 500 of the executable functions platform 104 generating maintenance information for an aircraft. In some cases, a maintenance engineer may download aircraft operational data 502 from the aircraft engine through the I/O interface 122. This download may automatically trigger the executable functions platform 104 to access a predictive maintenance lambda function 504 that is capable of determining a schedule of routine maintenance for the aircraft and any additional preventative maintenance required for the aircraft. The executable functions platform 104 may then run the predictive maintenance lambda function 504 using the aircraft operational data 502. In some cases, the executable functions platform 104 may be scalable so that multiple instances of the predictive maintenance lambda function 504 can run at the same time, for instance, in the event that there are multiple landings at the same time. Once, the analytic lambda function 504 has been executed, maintenance information 506 for the aircraft may be obtained and provided to the user interface 188. Memory 106 may be connected to the executable functions platform 104 and the predictive maintenance lambda function 504.

Method examples described herein can be machine- or computer-implemented at least in part. Some examples can include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined

What is claimed is:

1. A device for providing a localized executable functions platform to generate information for control systems, the device comprising:
   an I/O interface configured to communicate with the control systems;
   a memory configured to store a set of executable functions, wherein the executable functions comprise industrial lambda functions;
   an executable functions platform operatively coupled to the I/O interface and the memory and configured to:
      receive an initialization;
      determine an executable function needed to obtain information pertaining to a control system in response to the initialization;
      access the executable function from the set of executable functions stored in the memory;

run the executable function using input data for the control system;
obtain the information pertaining to the control system in response to running the executable function; and
provide the information pertaining to the control system in response to obtaining the information.

2. The device of claim 1, wherein the initialization comprises a request for the information pertaining to the control system.

3. The device of claim 1, wherein the initialization comprises a download/upload of the input data.

4. The device of claim 1, wherein the initialization comprises an occurrence of a specific time.

5. The device of claim 1, wherein the initialization comprises a change of state of the memory.

6. The device of claim 1, wherein the initialization comprises a change of state of the control system.

7. The device of claim 1, wherein the industrial lambda functions includes machine learning algorithms, first principle domain model simulation, operational workflow management, inventory management, operations management, control system diagnostics, and control system analytics algorithms.

8. The device of claim 1, further comprising a user interface including a display and wherein the input data is provided via the user interface and the information pertaining to the control system is provided on the display.

9. The device of claim 1, wherein the executable functions platform is further configured to run a second executable function when the second executable function is called by the executable function.

10. An executable functions platform used to generate information for control systems, the executable functions platform comprising:
    a trigger manager configured to identify an initialization event;
    a controller operatively coupled to the trigger manager and configured to:
        receive an initialization from the trigger manager, wherein the trigger manager sends the initialization in response to identification of the initialization event;
        determine an executable function needed to obtain information pertaining to a control system in response to the initialization, the executable function comprising an industrial lambda function;
        access the executable function stored in a local memory;
        run the executable function using input data for the control system;
        obtain the information pertaining to the control system in response to running the executable function; and
        provide the information pertaining to the control system in response to obtaining the information.

11. The executable functions platform of claim 10, wherein the initialization event comprises a request for the information pertaining to the control system.

12. The executable functions platform of claim 10, wherein the initialization event comprises a download/upload of the input data.

13. The executable functions platform of claim 10, wherein the initialization event comprises an occurrence of a specific time.

14. The executable functions platform of claim 10, wherein the initialization event comprises a change of state of the memory.

15. The executable functions platform of claim 10, wherein the initialization event comprises a change of state of the control system.

16. The executable functions platform of claim 10, wherein the executable functions platform is stored on a device that includes:
    an I/O interface configured to communicate with the control systems; and
    the local memory configured to store a set of executable functions; and
    wherein the executable functions platform is operatively coupled to the I/O interface and the local memory.

17. The executable functions platform of claim 16, wherein the device is operatively coupled to a remote device and the initialization event is sent from the remote device.

18. A system for providing a localized executable functions platform to generate information for control systems, the system comprising a device including:
    an I/O interface configured to communicate with the control systems;
    a memory configured to store a set of executable functions, wherein the executable functions comprise industrial lambda functions;
    an executable functions platform operatively coupled to the I/O interface and the memory and configured to:
        receive an initialization;
        determine an executable function needed to obtain information pertaining to a control system in response to the initialization;
        access the executable function from the set of executable functions stored in the memory;
        run the executable function using input data for the control system;
        obtain the information pertaining to the control system in response to running the executable function; and
        provide the information pertaining to the control system in response to obtaining the information; and
    a remote device operatively coupled to the device and the initialization is sent from the remote device.

* * * * *